Feb. 6, 1945.    A. SMITH    2,368,947
HOIST ATTACHMENT
Filed Sept. 25, 1944
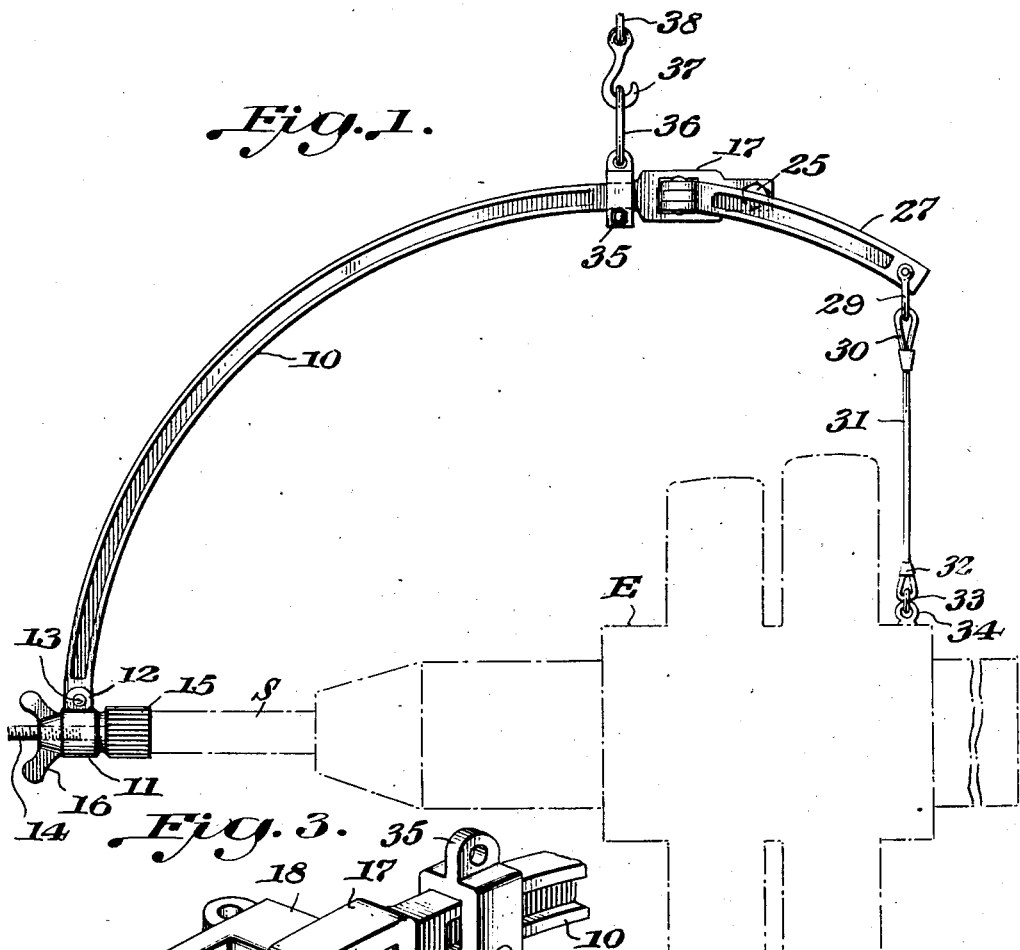
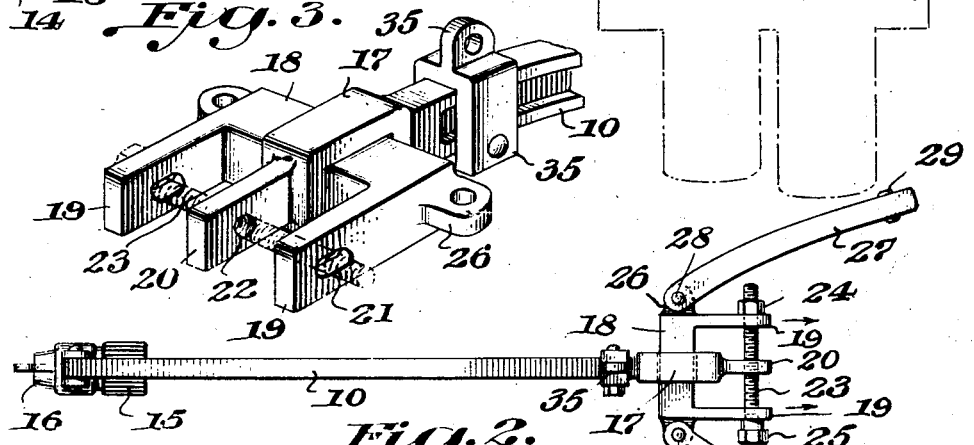
Inventor
Alexander Smith
By
[signature]
Attorney Patented Feb. 6, 1945

2,368,947

UNITED STATES PATENT OFFICE 2,368,947

HOIST ATTACHMENT

Alexander Smith, Macon, Ga.

Application September 25, 1944, Serial No. 555,722

5 Claims. (Cl. 294—78)

This invention relates to a lifting device or hoist attachment designed to facilitate handling of heavy, cumbersome objects, and particularly radial aircraft motors.

The invention is generally of the nature of, and an improvement over, that disclosed in my Patent No. 2,329,008 of September 7, 1943, the structure of which does not provide an adjustment as to balance when the motor is suspended as accurate as is desirable.

It is an object of the invention to provide an improved hoist attachment of simple, foolproof construction, which can be readily attached to an aircraft motor or the like to enable the same to be readily supported from a crane or other object and easily maneuvered to and from any definite position with minimum of labor and effort.

A further object of the invention is to provide a structure applicable to aircraft motors of all sizes and by means of which the supported object may be maintained properly balanced while suspended.

The foregoing and other objects and advantages will be apparent in view of the following description taken in conjunction with the drawing, wherein:

Figure 1 is a side elevation of a hoist attachment in accordance with the present invention applied to a radial engine;

Fig. 2, a top plan view of the attachment; and

Fig. 3, an enlarged detail perspective of the joint structure.

Referring to the drawing, the device comprises a curved bar 10 channel-shaped in cross-section for strength. The bar 10 is of uniform curvature and in use forms an arch. It has one end provided with a bearing member 11 with spaced ears 12 for receiving between them the extremity of the bar 10, the ears 12 and the bar 10 being connected by means of a pivot 13. The bear or supporting tip 11 is provided with a threaded opening for the reception in an externally threaded shank 13 of a fitting 15 for receiving the end of the propeller shaft of a radial engine or motor E or other heavy body. The fitting 15 is preferably knurled on its exterior so that it may be easily rotated for movement toward and from the shaft of the objects adapted to be locked in its adjusted position by means of a wing nut 16 threaded on the externally threaded member 14.

The opposite end of the bar 10 is likewise adapted to be connected to the radial engine or motor E and the device suspended from a crane not shown. On the end of the bar 10 opposite the fitting 11 is provided a yoke carrying member 17 having a substantially square opening therethrough for reception of the yoke 18 which is adjustably slidable therethrough. The yoke 18 has parallel side members 19 between which an extension 20 of the bar 10 is located. This construction permits the yoke to slide through the yoke carrying portion 17 of the bar 10 so that the extension 20 of the bar is moved toward or away from the side members 19. Since the side members 19 are in fixed relation movement of one toward the extension 20 will move the other away from the extension 20 and vice versa.

The side members 19 are provided with openings 21 and the extension 20 is provided with a threaded opening 22, an externally threaded adjusting member 23 being located in said openings and with its threads in engagement with the opening 22 so that the rotation of said member 23 will cause relative movement between the operating member and the member 20. The spaced abutments in the form of nuts 24 and 25 maintain the operating member 23 in axially fixed relation relative to the side members 19 of the yoke, and by means of the nut 25 the operating member 23 may be rotated, thus causing the yoke to travel laterally of the bar 10.

The yoke 18 is provided with oppositely disposed ears 26 to which curved arms 27 are attached by means of pivots 28. The arms 27 are preferably channel-shaped in cross section for strength, and their curvature corresponds to the curvature of the bar 10. To the outer extremities of the arms 27 are pivoted yoke brackets or clevises 29, to which are attached the upper looped ends 30 of suspension lengths 31, the lower looped ends 32 of which are adapted to be connected by any desired means, as for example clevises 33 to eye bolts or the like 34 affixed to the engine or motor E.

With the construction shown attachment to a motor or engine may readily be accomplished and the organization lifted by means of a bearing yoke or bracket 35 having a suspension link or ring 36 for engagement by a hook 37 on a crane cable 38. The bearing yoke or bracket 35 loosely receives the bar 10 so that the bar may slide endwise therethrough to vary the elevation of the ends of the bar to obtain the proper position of balance of the supported body. Also, by movement of the yoke 18 the bar 10 can be adjusted between the arms 27 to obtain the necessary balance and thus hold the suspended body in the desired position.

It will be readily understood that due to the adjustment of the fitting 15 and the swinging arms 27 that the device is adaptable to motors or engines of any size.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A hoist attachment for use in lifting heavy objects comprising a uniformly curved lifting and carrying bar adapted to be disposed with the curvature of said bar forming an arch, a suspension and carrying member for slidably supporting said bar, an internally threaded bearing member pivotally connected to one end of the bar, a fitting for connection to the device to be supported, said fitting having a threaded portion cooperating with the threads of the bearing to permit rotation of the fitting to cause it to be adjusted toward and away from the bearing member, a lock nut on said threaded portion of the fitting adapted to lock the fitting in fixed relation relative to the bearing, the opposite end of said bar being provided with a yoke receiving opening and a threaded opening, a yoke slidably mounted in said receiving opening, an externally threaded adjusting member connected to the arms of the yoke and having threaded engagement with the threaded opening in the bar and rotatable for causing the yoke to travel through the opening in the bar, a pair of arms curved corresponding to the curvature of said bar pivotally mounted on said yoke on parallel axes disposed at right angles to the path of movement of the yoke through said bar, and link members for connecting said arms and the object to be supported.

2. A hoist attachment for use in lifting heavy objects comprising a curved lifting bar, means for connecting each end of the bar to an object to be supported, including spaced arms, means for adjusting said spaced arms transversely of said bar when in supporting position, and a bearing member for slidably suspending said bar.

3. A hoist attachment for use in lifting heavy objects comprising a curved lifting bar, means for connecting each end of the bar to an object to be supported, including spaced arms, means for adjusting said spaced arms transversely of said bar when in supporting position, and a bearing member for slidably suspending said bar, said means including a threaded member connecting the yoke and the bar and rotatable for adjusting the lateral position of the yoke relative to the bar.

4. A hoist attachment for use in lifting heavy objects comprising a curved lifting bar adapted to be disposed so that the curvature of the bar forms an arch, three-point suspension means for connecting each end of the bar to be supported, including spaced arms at one end of the bar, means for adjusting said spaced arms transversely of said bar, and supporting means for slidably suspending said bar.

5. A hoist attachment for handling aircraft motors comprising a curved lifting and carrying member adapted to be disposed so that it forms an arch, a suspension and carrying member for slidably supporting said lifting and carrying member, and means carried by said lifting and carrying member for providing a three-point suspension of said motor, said last mentioned means comprising a single connection for adjustable attachment to the motor shaft, and a double connection for attachment to a remote portion of the motor, means for transversely adjusting said double connection relative to said lifting and carrying member, adjusting the distribution of weight of the object carried.

ALEXANDER SMITH.